US011983182B2

(12) United States Patent
Iyer et al.

(10) Patent No.: US 11,983,182 B2
(45) Date of Patent: May 14, 2024

(54) SYSTEM AND METHOD TO ENABLE A DATA ANALYTICS IN A SMART DATA ACCELERATOR INTERFACE DEVICE

(71) Applicant: DELL PRODUCTS, LP, Round Rock, TX (US)

(72) Inventors: Shyamkumar Iyer, Cedar Park, TX (US); Krishna Ramaswamy, Austin, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 17/081,177

(22) Filed: Oct. 27, 2020

(65) Prior Publication Data

US 2022/0129469 A1   Apr. 28, 2022

(51) Int. Cl.
*G06F 16/245* (2019.01)
*G06F 16/2455* (2019.01)
*G06F 16/248* (2019.01)
*G06F 21/62* (2013.01)

(52) U.S. Cl.
CPC .. *G06F 16/24569* (2019.01); *G06F 16/24552* (2019.01); *G06F 16/24568* (2019.01); *G06F 16/248* (2019.01); *G06F 21/6227* (2013.01)

(58) Field of Classification Search
CPC ......... G06F 16/24569; G06F 16/24568; G06F 16/24552; G06F 16/248; G06F 21/6227

USPC ........................................................ 707/769
See application file for complete search history.

(56) References Cited

U.S. PATENT DOCUMENTS

| | | | |
|---|---|---|---|
| 7,990,994 B1 * | 8/2011 | Yeh | H04L 12/4641 |
| | | | 711/147 |
| 10,672,008 B2 | 6/2020 | Braff | |
| 11,138,170 B2 * | 10/2021 | Crossley | H04L 63/0442 |
| 11,308,106 B1 * | 4/2022 | Muralimanohar | G06F 16/27 |
| 11,321,330 B1 * | 5/2022 | Pandis | G06F 16/2471 |
| 11,373,257 B1 * | 6/2022 | Guo | G06F 16/288 |
| 2013/0117766 A1 * | 5/2013 | Bax | G06F 9/4401 |
| | | | 719/323 |
| 2016/0127195 A1 | 5/2016 | Ripley et al. | |
| 2018/0203896 A1 * | 7/2018 | Chung | G06F 16/2453 |
| 2020/0133545 A1 * | 4/2020 | Alkalay | G06F 12/0238 |
| 2020/0301898 A1 * | 9/2020 | Samynathan | G06F 16/2453 |
| 2020/0409949 A1 * | 12/2020 | Saxena | G06F 9/505 |
| 2022/0237306 A1 * | 7/2022 | Saad | G06F 21/52 |

* cited by examiner

*Primary Examiner* — Joshua Bullock
(74) *Attorney, Agent, or Firm* — Larson Newman, LLP

(57) ABSTRACT

An information handling system includes a hardware device having a query processing engine to provide queries into source data and to provide responses to the queries. A processor stores a query to a query address in the memory device, issues a command to the hardware device, the command including the query address and a response address in the memory device, and retrieves a response to the query from the response address. The hardware device retrieves the query from the query address in response to the command, provides the query to the query processing engine, and stores a response to the query from the query processing engine to the response address.

20 Claims, 6 Drawing Sheets

SYSTEM AND METHOD TO ENABLE A DATA ANALYTICS IN A SMART DATA ACCELERATOR INTERFACE DEVICE

FIELD OF THE DISCLOSURE

This disclosure generally relates to information handling systems, and more particularly relates to enabling data analytics in a smart data accelerator interface (SDXI) device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a hardware device including a query processing engine to provide queries into source data and to provide responses to the queries. A processor may store a query to a query address in the memory device, issue a command to the hardware device, the command including the query address and a response address in the memory device, and retrieve a response to the query from the response address. The hardware device may retrieve the query from the query address in response to the command, provide the query to a query processing engine, and store a response to the query at the response address.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
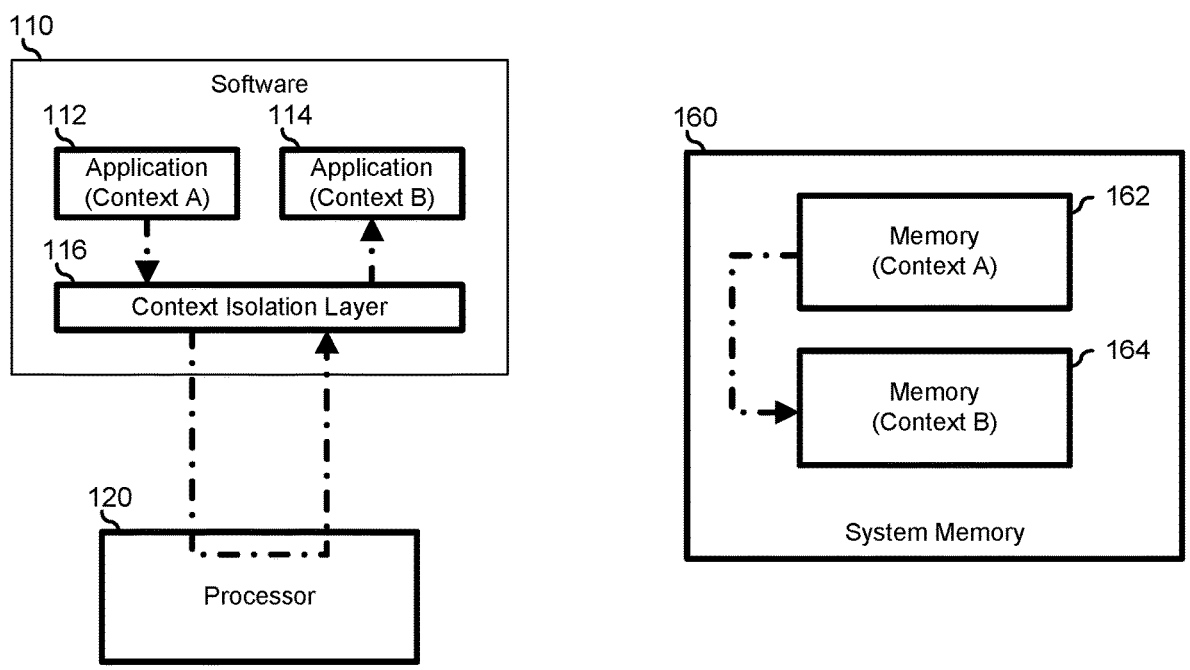
FIG. 1 is a block diagram of an information handling system according to the prior art.

FIG. 1 illustrates an information handling system 100 that utilizes a data exchange architecture in accordance with the prior art. Information handling system 100 includes software 110, a processor 120, and a system memory 160. Software 110 represents machine-executable code stored on information handling system 100 that is executable by processor 120, and includes a first application 112 that is associated with a first context, a second application 114 that is associated with a second context, and a context isolation layer 116. Application 112 is associated with one or more address ranges in the system physical address space (SPA) provided by system memory 160. The address ranges associated with application 112 are collectively shown as a portion 162 of system memory 160. Similarly, application 114 is associated with one or more address ranges in system memory 160, collectively shown as a portion 164 of the system memory. Context isolation layer 116 represents one or more agent, application program interface (API), utility, or the like that operates to maintain the isolation between memory 162 and 164. Examples of context isolation layer 116 may include a system Basic Input/Output System (BIOS) or Universal Extensible Firmware Interface (UEFI), hereinafter referred to collectively as "BIOS," that operates to provide isolated memory ranges for system operations, a virtual desktop system that isolates various memory ranges for the use of multiple users of the virtual desktop system, a hypervisor or virtual machine manager (VMM) that sets up and maintains virtual machines and their associated memory ranges, or the like.

In operation, when applications 112 and 114 are instantiated on information handling system 100, context isolation layer 116 allocates memory 162 and 164 to the use of their respective applications. In addition, when applications 112 and 114 need to interact, for example by moving data from one application to the other, context isolation layer 116 operates to manage the transfer of data between memory 162 and 164.

Note here that the data exchange architecture of information handling system 100 requires the execution of code associated with context isolation layer 116 by processor 120 in order to perform data transfers between memory 162 and memory 164. As such, the prior art data exchange architecture imposes a processing burden on processor 120, thereby reducing the processor cycles available for performing other tasks associated with applications 112 and 114. It will be understood that this processing overhead may be partially mitigated by the inclusion of Direct Memory Access (DMA) hardware in information handling system 100. However, it will be further understood that such DMA hardware is typically a vendor specific add-on, and access to such DMA hardware by applications 112 and 114 directly is typically difficult. In particular, even with the inclusion of DMA hardware, processor 120 is still needed to set up DMA transfers, and context isolation layer 116 is still needed in its role as gatekeeper to system memory 160.

Figure 2:
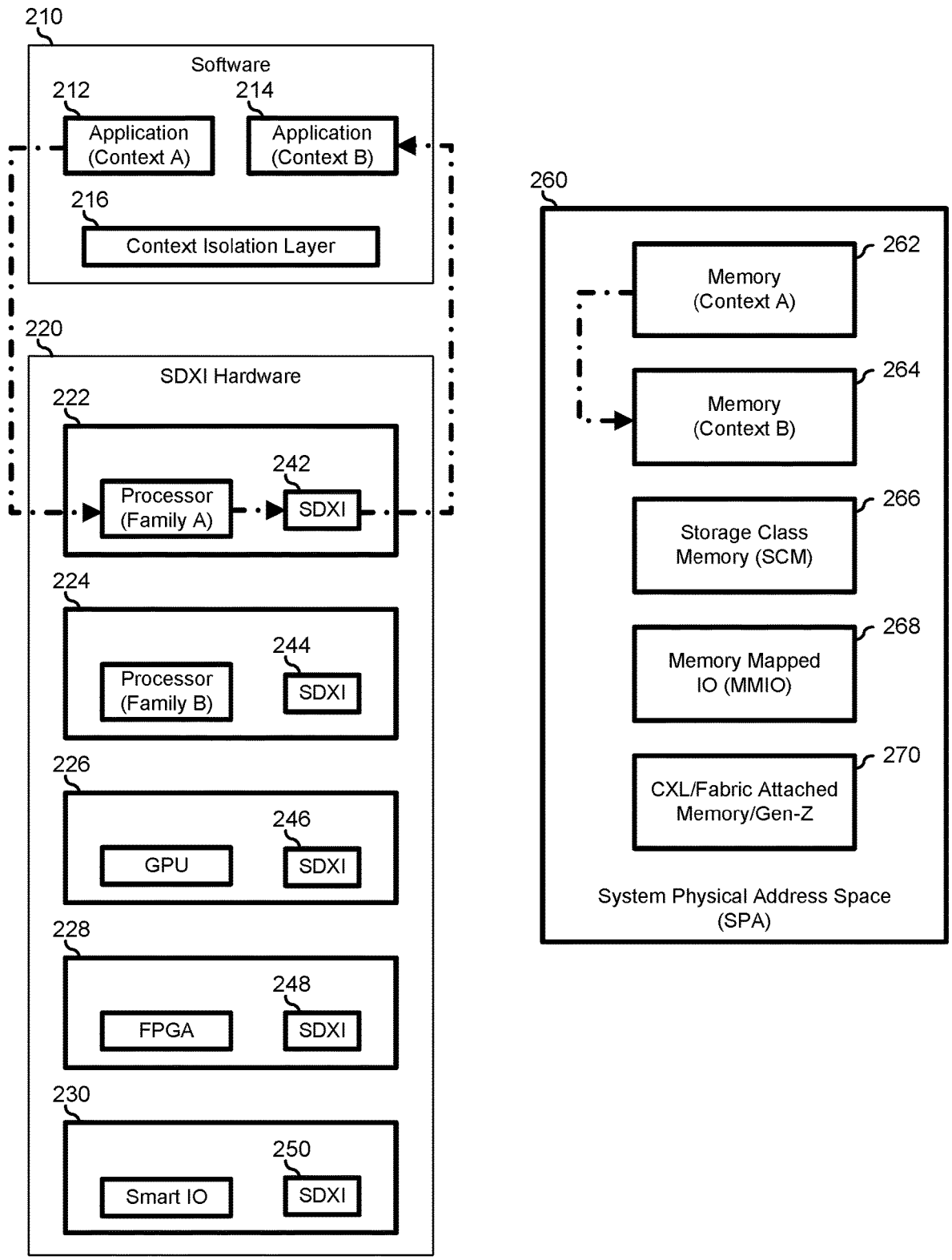
FIG. 2 is a block diagram of an information handling system according to an embodiment of the current disclosure.

FIG. 2 illustrates an information handling system 200 that utilizes a Smart Data Accelerator Interface (SDXI) data exchange architecture in accordance with an embodiment of the current disclosure. Information handling system 200 includes software 210, SDXI hardware 220, and a system physical address space (SPA) 260. SDXI hardware 220 includes a first family of processors 222 and an associated SDXI interface 242, a second family of processors 224 and an associated SDXI interface 244, one or more Graphics Processor Unit (GPU) 226 and an associated SDXI interface 246, a Field-Programmable Gate Array (FPGA) 248 and an associated SDXI interface 248, and a Smart I/O device 230 and an associated SDXI interface 250. Software 210 is similar to software 110, and represents machine-executable code stored on information handling system 200 that is executable by a processor such as one or more of processors 222 and 224. Software 210 includes a first application 212 that is associated with a first context, a second application 214 that is associated with a second context, and a context isolation layer 216. Software 210 may include functions and features similar to software 110, as described above. In particular, software 210 may implement the data exchange architecture of information handling system 100, as needed or desired. As such, application 212 is associated with one or more address ranges in SPA 260, with the associated address ranges shown as a portion 262 of the SPA, and application 214 is associated with one or more address ranges in the SPA, with the associated address ranges shown as a portion 264 in the SPA. Here too, context isolation layer 216 is similar to context isolation layer 116, representing one or more agent, API, utility, or the like that operates to maintain the isolation between memory 262 and 264. As such, context isolation layer 216 operates to allocate memory 262 and memory 264 when respective application 212 and application 214 are instantiated on information handling system 200, and the context isolation layer prevents the use of various memory ranges by unauthorized applications.

The SDXI data exchange architecture represents an industry effort to expand and standardize data movement protocols and hardware accelerator interfaces. As such, information handling system 200 broadens the scope of data exchanges on both the hardware side and the memory side. In particular, on the hardware side, SDXI hardware 220 incorporates various types of processing elements, co-processors, accelerators, and other data movers, as typified by processor families 222 and 224, GPU 226, FPGA 228, and Smart I/O device 230. On the memory side, SPA 260 is expanded to include not only the system physical memory, as typified by memory 262 and memory 264, but also separately attached memory, such as Storage Class Memory (SCM) devices 266, memory mapped I/O (MMIO) devices 268, and memory architectures, such as Compute Express Link (CXL) and Gen-Z memory interfaces, fabric-attached memory, and the like, as shown collectively as memory device 270. In particular, the SDXI data exchange architecture treats all of memory devices 262, 264, 266, 268, and 270 as a single SPA 260. The SDXI data exchange architecture then provides standardized interfaces for data movement between software 210, SDXI hardware 220, and SPA 260. Here, SDXI interfaces 242, 244, 246, 248, and 250 represent hardware and software associated with their respective hardware devices, such that a common set of SDXI commands, instructions, procedures, calls, and the like, referred to hereinafter as "SDXI commands," can be made to the hardware devices. Here, the details of implementing the various SDXI commands can be left to the design requirements and desires of the various hardware manufacturers. In this way, the SDXI data exchange architecture remains extensible and forward-compatible with new hardware or memory developments, and is independent of actual data movement details, data acceleration implementations, and the underlying I/O interconnect technology. The SDXI commands support: data movement between different address spaces including user address spaces located within different virtual machines; data movement without mediation by privileged software once a connection has been established; an interface and architecture that can be abstracted or virtualized by privileged software to allow greater compatibility of workloads or virtual machines across different servers; a well-defined capability to quiesce, suspend, and resume the architectural state of a per-address-space data mover to allow "live" workload or virtual machine migration between servers; mechanisms to enable forwards and backwards compatibility across future specification revisions, allowing software and hardware designed to different specification revisions to interoperate; the ability to incorporate additional offloads in the future leveraging the architectural interface; and a concurrent DMA model. As used herein, SDXI will be understood to represent any present or future specifications, specification revisions, articles, working papers, or other publications of the Smart Data Accelerator Interface (SDXI) Technical Working Group (TWG) of the Storage Networking Industry Association (SNIA).

Figure 3:
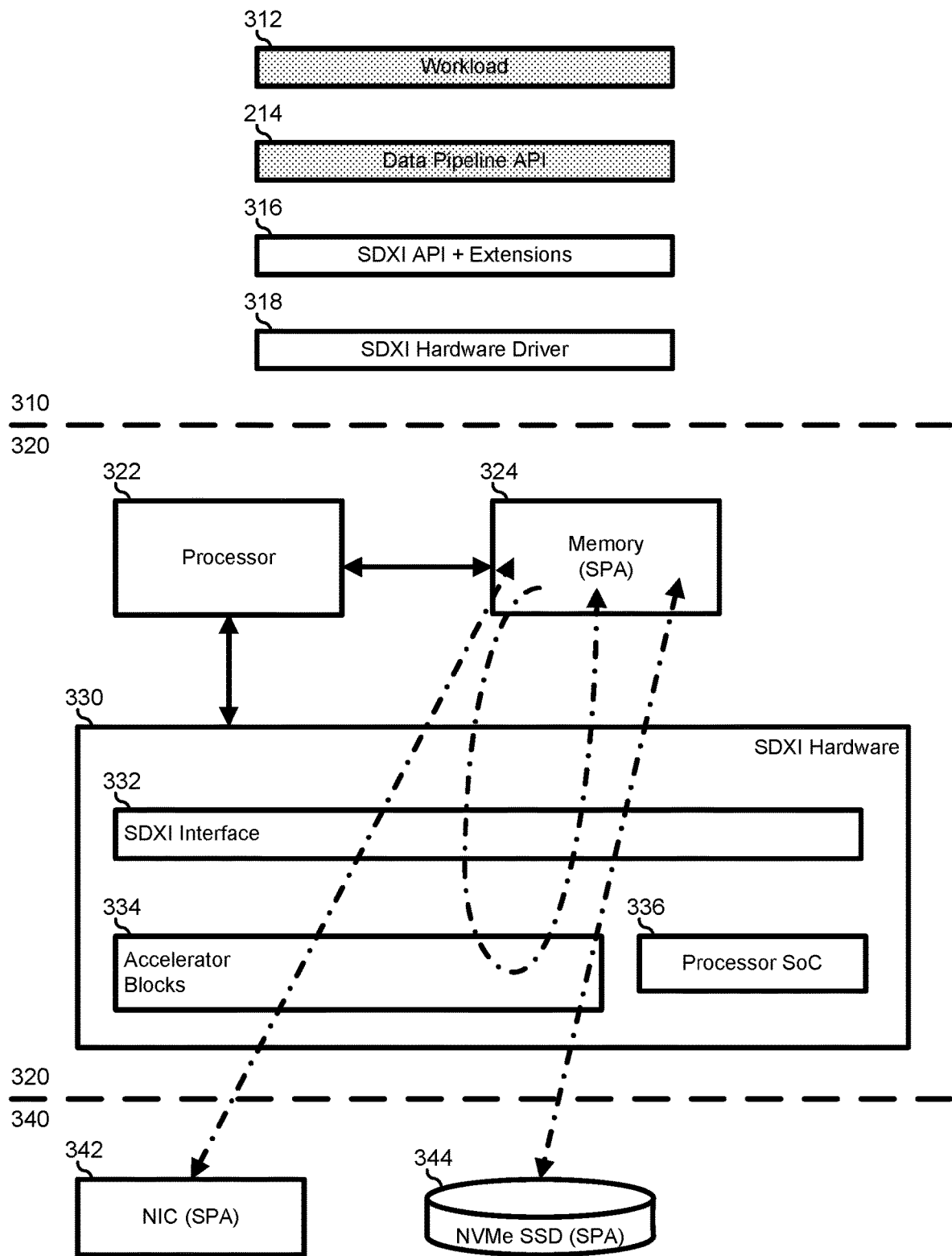
FIG. 3 is a block diagram of an information handling system according to another embodiment of the current disclosure.

FIG. 3 illustrates an embodiment of an information handling system 300 similar to information handling system 200. Information handling system 300 includes a software layer 310, a hardware layer 320, and an attachment layer 340. Software layer 310 is similar to software 210, and includes a workload 312, a data pipeline API 314, a SDXI API 316, and a SDXI hardware driver 318. Hardware layer 320 includes a processor 322, a memory (SPA) 324, and a SDXI hardware device 330. Attachment layer 340 includes a Network Interface Card (NIC) 342 and a Non-Volatile Memory-Express (NVMe) Solid State Drive (SSD) 344. NIC 342 and SSD 344 are each extensions of the SPA space of information handling system 300.

Workload 312 and data pipeline API 314 operate similarly to applications 212 and 214, and context isolation layer 216, and represent elements of a typical information handling system that perform the processing task of the information handling system. In particular, workload 312 operates to perform various operations on data and to move data between different storage and processing elements of information handling system 300, and may make various service calls to data pipeline API to assist in such processing operations and data moves. SDXI API 316 represents an API configured to provide the core operability as specified by a particular revision of an SDXI specification. In addition, SDXI API 316 provides additional extensions to the core operability of the particular SDXI specification, as described below. When workload 312 or data pipeline API 314 invoke SDXI API 316 for the various data operations or data moves, the SDXI API operates to direct SDXI hardware driver 318 elicit SDXI hardware 330 to perform one or more of the invoked operations or data moves, as needed or desired. In this regard, SDXI hardware driver 318 and SDXI hardware 330 are closely associated with each other.

As such, SDXI hardware 330 represents a wide variety of different types of hardware that can be utilized to perform the SDXI core operations and extensions as described herein. An example of SDXI hardware 330 may include accelerator blocks within a general purpose processor or processor family, such as a CPU or the like, a purpose specific processor, such as a GPU or the like, a logic-based device or state-based device, such as a FPGA, a Complex Programmable Logic Device (CPLD) or the like, a smart I/O device that provides in-line data processing in the course of I/O operations, such as a smart NIC, a Host Bus Adapter (HBA), a storage controller such as a RAID controller, a Network Attached Storage (NAS) device, a Storage Area Network (SAN) controller, or the like, or another processing device, as needed or desired. Here, it will be understood that, SDXI hardware 330 may be configured to provide operations consistent with its type, but that are not specifically associated with its SDXI functionality. For example, where SDXI hardware 330 represents a FPGA type of device, it will be understood that the FPGA device may be invoked to provide functionality of a more general nature, in addition to the SDXI functionality as described herein.

SDXI hardware 330 includes a SDXI interface 332, various accelerator blocks 334, and a processor SoC 336. Accelerator blocks 334 may represent hardware accelerators, logic-based or state-based accelerators, or other configurable or pre-configured accelerator functions, as needed or desired. As described further below, SDXI hardware 330 may operate in some embodiments to provide enhanced data pipelining operations. For example, SDXI hardware 330 may provide data movement: between different locations in memory 324, to and from the memory and a network connected to NIC 342, to and from the memory and NVMe SSD 344, to and from the network and the NVMe SSD, and between different locations in the NVME SSD. SDXI hardware 330 may further operate in some embodiments to provide enhanced data transformation operations on data, either as atomic operations or in conjunction with the data movement utilizing various accelerator blocks 334. In particular, various embodiments of SDXI hardware 330 may provide: data compression/decompression, data encryption/decryption, data checksums, hash functions such as SHA-256 hashes and the like, RAID functions, erasure coding, and the like. Other functions that may be performed by SDXI hardware 330 may include data deduplication, LZ-4 compression, compression ratio and block size optimization, data operation chaining, multi-point data movement, uncompressible block handling, and query analytics.

Figure 4:
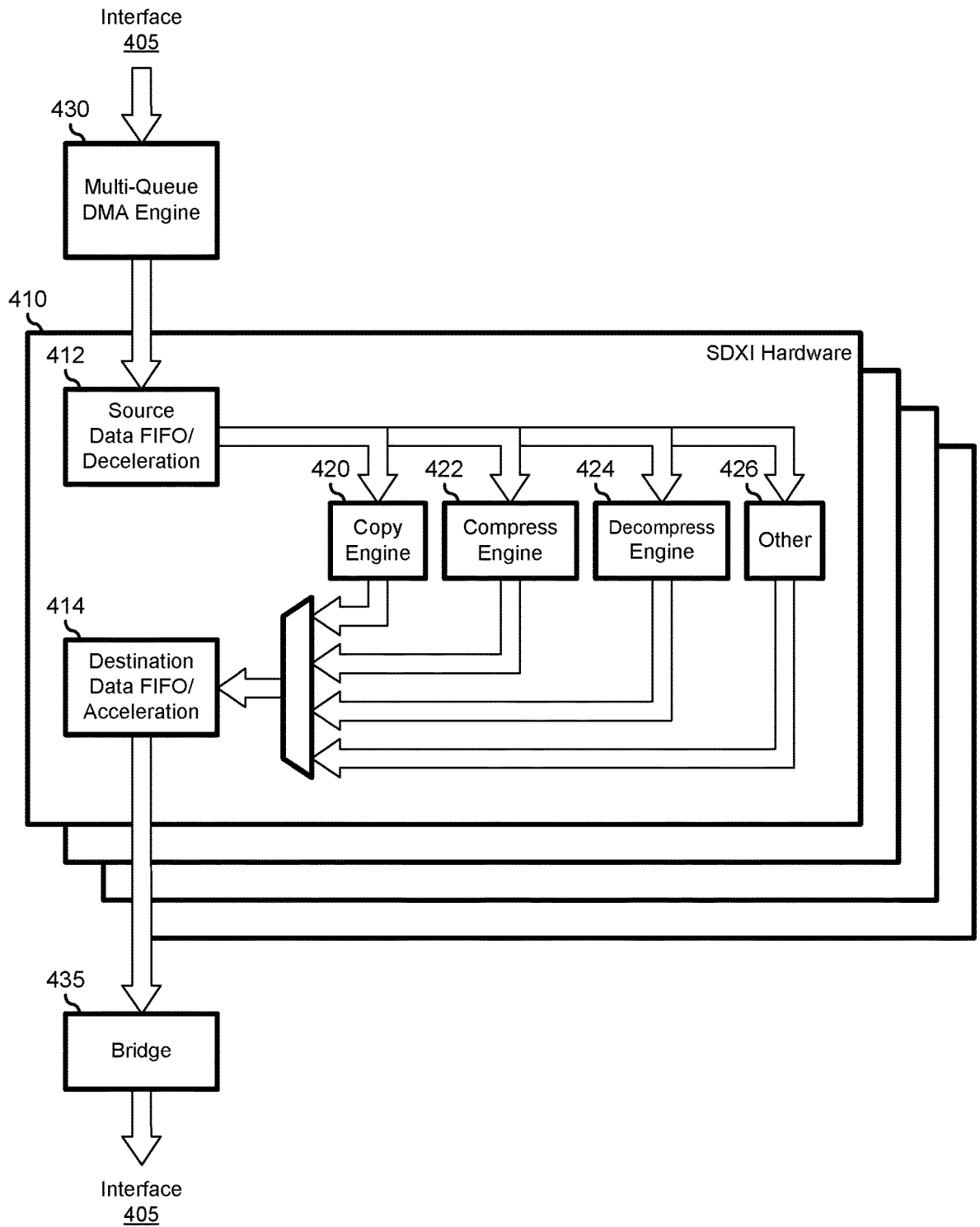
FIG. 4 is a block diagram of an information handling system according to another embodiment of the current disclosure.

FIG. 4 illustrates an embodiment of an information handling system 400 similar to information handling systems 200 and 300. Information handling system 400 includes a processor complex (not illustrated) that provides a communication interface 405 to provide data communications with multiple SDXI hardware devices 410. An example of interface 405 may include a Third Generation Peripheral Component Interconnect-Express (PCIe Gen3)×16 (16-lane) communication link, a PCIe Gen3 communication link with greater or fewer lanes (e.g., ×4, ×8, ×32), or another communication interface, as needed or desired. Information handling system 400 further includes a multi-queue Direct Memory Access (DMA) engine 430, and a data bridge 435. Each of the SDXI hardware devices 410 are connected to receive data and instructions from DMA engine 430, and to provide data and control information to data bridge 435. DMA engine 430 provides dynamic allocation of parallel data flows to the multiple SDXI hardware devices 410, as needed by the processing tasks operating on information handling system 400. The data flows are provided to DMA engine 430 via interface 405, and may be received from memory or storage devices within the SPA of information handling system 400. Data bridge 435 receives the data flows from SDXI hardware devices 410 and communicates the data flows via interface 405 to the memory and storage devices within the SPA of information handling system 400.

Each of the SDXI hardware devices 410 may be understood to be similar hardware devices, such as where the SDXI hardware devices are each provided by a common manufacturer and are a common device type. Here, DMA engine 430 may allocate data flows to the various SDXI hardware devices 410 based upon factors unrelated to the particular device type of the SDXI hardware devices. For example, DMA engine 430 may allocate data flows based upon the resource loading or availability of each of the SDXI hardware devices, the power level or power state of each of the SDXI hardware devices, or other factors not directly related to the type of the SDXI hardware devices, as needed or desired. Further, each of SDXI hardware devices 410 may be understood to be different hardware devices, such as where the SDXI hardware devices are provided by different manufacturers and are different device types. Here, DMA engine 430 may allocate data flows to the various SDXI hardware devices 410 based upon the type of each of the SDXI hardware devices. For example, where a particular SDXI hardware device 410 contains a network function, DMA engine 430 may allocate network based data flows to that particular SDXI function. On the other hand, where a different SDXI hardware device contains a storage controller function, DMA engine 430 may allocate storage based data flows to the other SDXI function.

SDXI hardware device 410 is illustrated as including a source data FIFO/deceleration module 412, a destination data FIFO/acceleration module 414, a copy engine 420, a compression engine 422, a decompression engine 424, and one or more additional engines 426. The configuration illustrated by SDXI hardware device 410 will be understood to be typical, and representative of a wide range of device configurations, as needed or desired. As such, the particular configuration illustrated by SDXI hardware device 410 should not be understood to be limiting on the type, nature, features, configuration, or functionality of SDXI hardware devices in general. Other functions that may be performed by SDXI hardware 410 may include data deduplication, LZ-4 compression, compression ratio and block size optimization, data operation chaining, multi-point data movement, uncompressible block handling, and query analytics.

The inventors of the present disclosure have understood typical data analytics and queries in diverse data structures involves software abstractions in multiple software layers, and necessitates multiple data moves into and out of memory storage devices. For example, to perform a particular data analytics operation, software may invoke a processor to move a block of the data to be analyzed from a storage device into system memory, and then further invoke the processor to operate on the data in system memory to analyze the data. Where the source data is large, the query might further involve multiple cycles of data movement and data analysis each cycle consuming additional processor cycles. Moreover, the software stack may include layers associated with data movement from various types of I/O devices, such as storage interfaces, network interfaces, and the like. In this regard, software that initiates a data analytics operation may need to be aware of the complexion of the storage/network stack to correctly structure a data query or data analytics request. Hence the software associated with making a data query or data analytics request becomes more complex, and must take into account the different architectural environments.

Efforts to streamline data queries and data analytics have focused on fast descriptor-based memory interfaces, such as the NVMe interface for memory-to-storage and storage-to-memory transactions. Other efforts include computational storage/computational memory which hybridizes memories to include processing functions. However, such efforts fail to provide a simple, transport-agnostic means for providing direct memory-to-memory based query and analytics requests.

In a particular embodiment, the SDXI architecture is extended such that SDXI commands may include descriptors for the performance of data queries and data analytics. Here, the standardized SDXI interface for accessing widely varied storage and network architectures is utilized as a front end for data queries and data analytics requests. In this way, the need for the data query and data analytics request software does not need to be aware of the specifics of the I/O architecture. Further, data queries and data analytics requests can be performed by SDXI hardware devices with offload engines configured to perform the data queries and data analytics requests, without the need to move data back and forth between the I/O devices and the host processing system memory.

Figure 5:
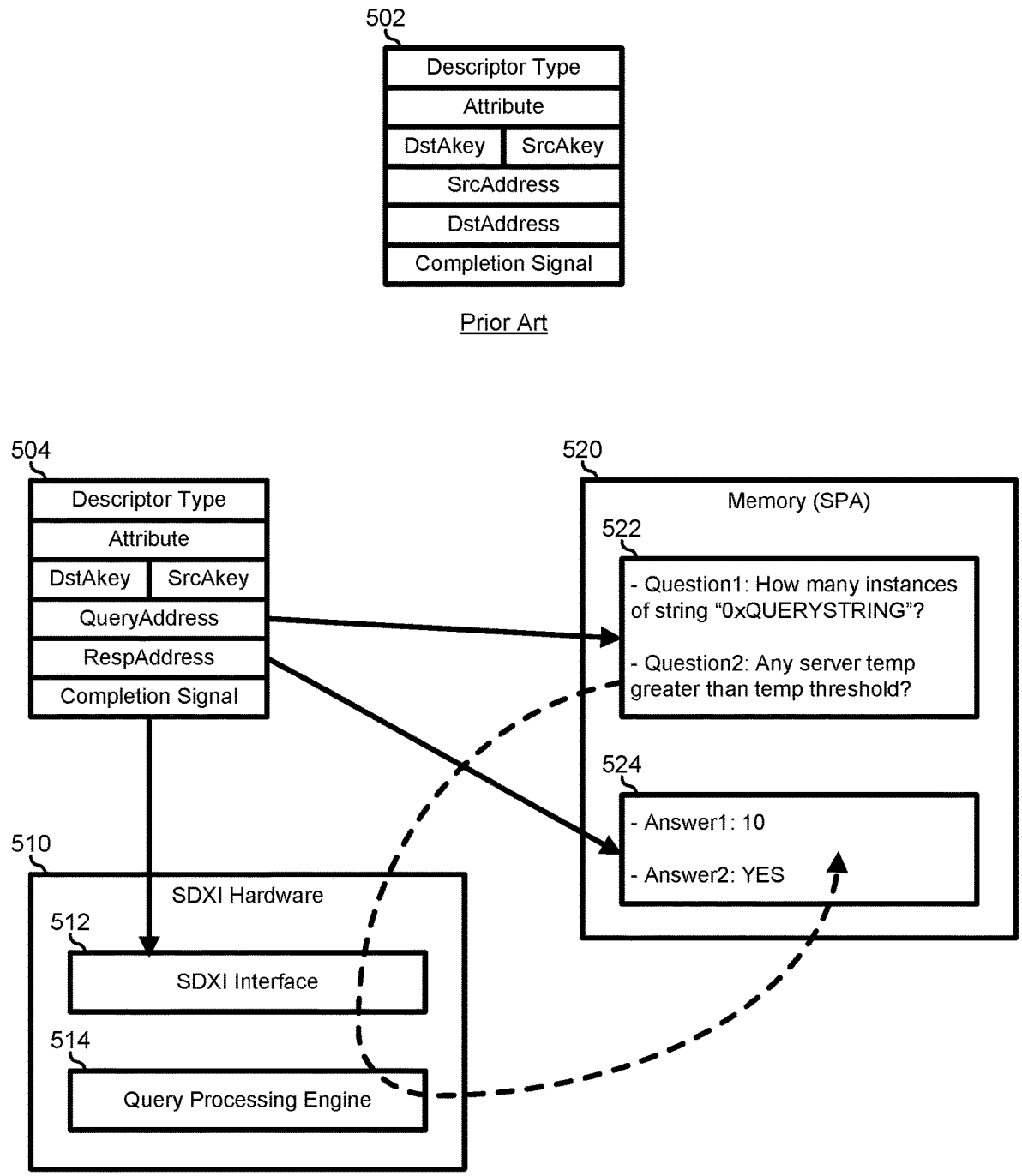
FIG. 5 is a block diagram of an information handling system to enable data analytics in a smart data accelerator interface (SDXI) device according to an embodiment of the current disclosure.

FIG. 5 illustrates an information handling system 500 configured to provide data queries and data analytics requests via SDXI commands. Information handling system 500 includes a SDXI hardware device 510 and a memory 520. SDXI hardware device 510 is similar to SDXI hardware devices 330 and 410, and includes a SDXI interface 512 and a query and analytics processing engine 514. Memory 520 represents one or more data storage devices, either local to information handling system 500, such as a memory device associated with the host processing system, or remote, such as a storage device like a distributed storage array or a network attached data source, as needed or desired. In particular, memory 520 is associated with the SPA of information handling system 500, as extended by the SDXI architecture, as described above. It will be understood that information handling system 500 further includes a database, another other data structure, or data source (not illustrated), referred to hereinafter collectively as "data source," to which the disclosed data queries and data analytics requests are directed. Interactions with such a data source will be described further below.

Information handling system 500 is illustrated with a SDXI command 502, as is known in the prior art. SDXI command 502 includes a descriptor type field, an attribute field, a destination address key field (DstAkey), a source address key field (SrcAkey), a source address field, a destination address field, and a completion signal field. SDXI commands are known in the art, as are the programming and use of the various fields therein, and SDXI commands will no be further described herein, except as needed to illustrate the current embodiments.

Information handling system 500 is further illustrated with a query-based SDXI command 504, according to an embodiment of the current disclosure. Query-based SDXI command 504 includes a descriptor type field, an attribute field, a destination address key field (DstAkey), a source address key field (SrcAkey), a query address field, a response address field, and a query completion signal field. Here, the fields with common names between SDXI command 502 and SDXI command 504 have common functions. However, in contrast to SDXI command 502 that has source address and destination address fields, SDXI command 504 has query address and response address fields. Note that compatibility with the SDXI architecture is maintained based upon the fact that the query address field of SDXI command 504 occupies the same location as the source address field of SDXI command 502, and the response address field of SDXI command 504 occupies the same location as the destination address field of SDXI command 502.

The query address of SDXI command 504 provides an address 522 in memory 520 that stores one or more data query or data analytics request that is to be performed on the data structure. In a first case, the location of the data source may be implied. For example, query processing engine 514 may be preconfigured with a known data source, or, in another example, the query address field may point to different memory locations, and the query processing engine may be preconfigured to associated the different query addresses with different data sources. In the illustrated example, queries to a data structure are written into address 522, including a first question, "How many instances of string '0×QUERYSTRING'?", and a second question, "Any server temp greater than temp threshold?" In another example, information included in each query question may include a pointer to the different data sources. For example, the questions stored at address 522 may each have an associated field that encodes a data source. Hence, the first question may include a bit field that is stored with an encoding that references a database as the data source, and the second question may include a bit field that is stored with a different encoding that references a data center management system that accumulates server temperature data. Note that, as illustrated, the questions are provided in natural language form, but this is not necessarily so. For example, the actual data stored at address 522 may be encoded, such that the first question includes a bit field that encodes the question "How many instances of string:?" followed by the string "0×QUERYSTRING." More generally, the data stored at query address 522 may take any form that query processing engine 514 is configured to handle. Example query types may include: JSON, XML, Redfish, other proprietary key/value notations, artificial intelligence/machine learning (AWL) based query notation, and the like. The details of processing data queries and data analytics request, including the forms of the input data to initiate such data queries and data analytics requests are known in the art, and will not be further described herein, except as needed to illustrate the current embodiments.

When SDXI hardware device 510 receives SDXI command 504, query processing engine 514 retrieves the query data from query address 522, and proceeds to operate on the source data to determine the query responses. Here, query processing engine 512 operates independently of the host processing system in the interactions with the source data. For example, where the source data is a database, query processing engine 514 can operate through a NVMe interface to query the database directly, without invoking the host processing system. In another example, where the source data is a datacenter management system, query processing engine 514 can operate through a NIC interface to query the datacenter management system directly, without invoking the host processing system. When the query responses are obtained by query processing engine 514, the query processing engine stores the responses to a response address 524 that is indicated by the response address field of SDXI command 504. After the responses are written to the response address 524, SDXI hardware device 510 provides a completion signal as indicated by the completion signal field of SDXI command 504.

Here broadly, the querying software operating on the host processing system need only store the queries to query location 522, invoke the SDXI driver to provide SDXI command 504 to SDXI hardware device 510, and then wait to retrieve the response from response address 524. Thus it can be seen that overlaying data query and data analytics requests on the SDXI architecture permits a streamlined process flow, freeing the host processing system from the load of executing the queries.

In a particular embodiment, a query maker, that is, the software that provides the data query or data analytics request, may be different from the consumer of the query response. Here, where the source data is under access control, such that only privileged agents may access the source data, a privileged agent may act as the query maker, and, by storing the response in a more generally accessible portion of memory, other agents that lack the privileged status may read the query response directly from memory. For example, with the query "Any server temp greater than temp threshold?", the server temperature data may be restricted information that can only be accessed by a datacenter management system. Here, the data center management system can make the query, and store the response in a generally available address space of the system memory, such that other, non-privileged agents may obtain the response.

Figure 6:
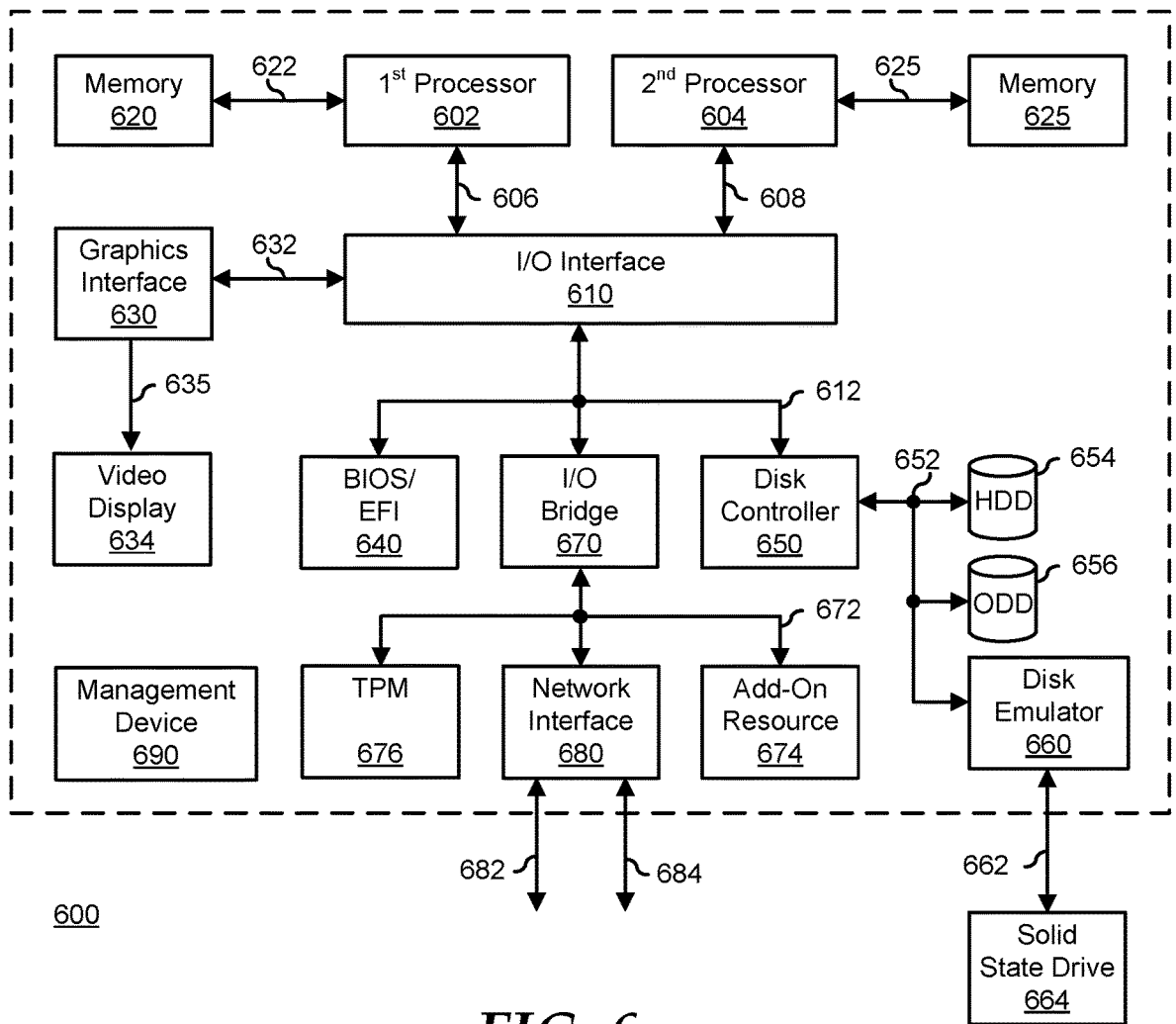
FIG. 6 is a block diagram illustrating a generalized information handling system according to another embodiment of the present disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. An information handling system, comprising:
   a memory device;
   a processor; and
   a Storage Networking Industry Association (SNIA) hardware smart data accelerator interface (SDXI) device including a query processing engine to provide queries into source data and a SDXI interface to receive the queries and to provide responses to the queries;
   wherein the processor is configured to store a first query to a first query address in the memory device, issue a first command to the SDXI interface, the first command including the first query address and a first response address in the memory device, and retrieve a first response to the first query from the first response address; and
   wherein the hardware SDXI device is configured to process the first command to retrieve the first query from the first query address in response to the first command, provide the first query to the query processing engine, and store a first response to the first query from the query processing engine to the first response address, wherein in processing the first command, the hardware SDXI device does not utilize processing resources of the processor.

2. The information handling system of claim 1, wherein:
the processor is further configured to store a second query to the first query address, and retrieve a second response to the second query from the first response address; and
wherein the hardware SDXI device is configured to further process the first command to retrieve the second query from the first query address in further response to the first command, provide the second query to the query processing engine, and store a second response from the query processing engine to the first response address.

3. The information handling system of claim 2, wherein the first query is to first source data and the second query is to second source data.

4. The information handling system of claim 3, wherein the first query includes a first pointer to the first source data and the second query includes a second pointer to the second source data.

5. The information handling system of claim 1, wherein:
the processor is further configured to store a second query to a second query address in the memory device, issue a second command to the SDXI interface, the second command including the second query address and a second response address in the memory device, and retrieve a second response to the second query from the second response address; and
wherein the hardware SDXI device is configured to process the second command to retrieve the second query from the second query address in response to the second command, provide the second query to the query processing engine, and store a second response to the second query from the query processing engine to the second response address, wherein in processing the second command, the hardware SDXI device does not utilize the processing resources of the processor.

6. The information handling system of claim 5, wherein the first query is to first source data and the second query is to second source data.

7. The information handling system of claim 6, wherein the first query is made to the first source data by the query processing engine based upon the first query address and the second query is made to the second source data by the query processing engine based upon the second query address.

8. The information handling system of claim 1, wherein;
the processor is further configured to receive the first query from a first application instantiated on the processor, and to provide the first response to a second application instantiated on the processor.

9. The information handling system of claim 8, wherein the first query is to first source data to which the first application has privileged access, and wherein the second application lacks privileged access to the first source data.

10. The information handling system of claim 1, wherein the first query is at least one of a JSON query, an XML, query, and a Redfish query.

11. A method, comprising:
storing, by a processor of an information handling system, a first query to a first query address in a memory device of the information handling system;
issuing, by the processor, a first command to a Storage Networking Industry Association (SNIA) smart data accelerator interface (SDXI) interface of a hardware SDXI device of the information handling system, the hardware SDXI device including a query processing engine to provide queries into source data and to provide responses to the queries, the first command including the first query address and a first response address in the memory device;
processing, by the hardware SDXI device, the first command, wherein in processing the first command, the hardware SDXI device does not utilize processing resources of the processor and the method further comprises:
retrieving, by the hardware SDXI device, the first query from the first query address in response to the first command;
providing the first query to the query processing engine;
storing a first response to the first query from the query processing engine to the first response address; and
retrieving the first response from the first response address.

12. The method of claim 11, further comprising:
storing a second query to the first query address;
retrieving the second query from the first query address in further response to the first command;
providing the second query to the query processing engine;
storing a second response from the query processing engine to the first response address; and
retrieving the second response from the first response address.

13. The method of claim 12, wherein the first query is to first source data and the second query is to second source data.

14. The method of claim 13, wherein the first query includes a first pointer to the first source data and the second query includes a second pointer to the second source data.

15. The method of claim 11, further comprising:
storing a second query to a second query address in the memory device;
issuing a second command to the SDXI interface, the second command including the second query address and a second response address in the memory device;
processing, by the hardware SDXI device, the first command, wherein in processing the first command, the hardware SDXI device does not utilize processing resources of the processor and the method further comprises:
retrieving the second query from the second query address in response to the second command;
providing the second query to the query processing engine; and
storing a second response to the second query from the query processing engine to the second response address; and
retrieving the second response from the second response address.

16. The method of claim 15, wherein the first query is to first source data and the second query is to second source data.

17. The method of claim 16, wherein the first query is made to the first source data by the query processing engine based upon the first query address and the second query is made to the second source data by the query processing engine based upon the second query address.

18. The method of claim 11, further comprising:
receiving the first query from a first application instantiated on the processor; and
providing the first response to a second application instantiated on the processor.

19. The method of claim 18, wherein the first query is to first source data to which the first application has privileged access, and wherein the second application lacks privileged access to the first source data.

20. A Storage Networking Industry Association (SNIA) hardware smart data accelerator interface (SDXI) device of an information handling system, the hardware SDXI device comprising:
   an SDXI interface configured to receive a command from the information handling system, the command including a first address within a memory device of the information handling system, and a second address within the memory device; and
   a first processor configured to retrieve a query from the first address in response to the command, to query source data based upon the query, and to provide a response to the query to the interface without utilizing processing resources of a second processor of the information handling system;
   wherein the interface is further configured to store the response to the second memory address.

* * * * *